United States Patent
Gadde et al.

(10) Patent No.: US 7,269,953 B2
(45) Date of Patent: Sep. 18, 2007

(54) METHOD OF CONTROLLING A POWER GENERATION SYSTEM

(75) Inventors: Satish Gadde, Orlando, FL (US); Christopher Humphrey, Orlando, FL (US); Stefan Schneider, Nordheim (DE); Fadi Tadros, Orlando, FL (US); Jatinder Singh, Orlando, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 378 days.

(21) Appl. No.: 10/928,524

(22) Filed: Aug. 27, 2004

(65) Prior Publication Data

US 2006/0042258 A1  Mar. 2, 2006

(51) Int. Cl.
 *F02C 9/50* (2006.01)
(52) U.S. Cl. ................................ 60/773; 60/39.27
(58) Field of Classification Search .............. 60/39.27, 60/39.281, 772, 773, 794
 See application file for complete search history.

(56) References Cited

U.S. PATENT DOCUMENTS

| | | | |
|---|---|---|---|
| 4,550,565 A | 11/1985 | Ozono | |
| 4,578,944 A | 4/1986 | Martens et al. | |
| 5,558,511 A | 9/1996 | Hedelin | |
| 5,584,171 A | 12/1996 | Sato et al. | |
| 5,636,507 A | 6/1997 | Rajamani et al. | |
| 6,164,057 A | 12/2000 | Rowen et al. | |
| 6,226,974 B1 | 5/2001 | Andrew et al. | |
| 6,328,526 B1 | 12/2001 | Seki et al. | |
| 6,338,240 B1 | 1/2002 | Endo et al. | |
| 6,408,611 B1 | 6/2002 | Keller et al. | |
| 6,442,928 B1 | 9/2002 | Endo et al. | |
| 6,442,945 B1 | 9/2002 | Rakhmailov | |
| 6,598,402 B2 | 7/2003 | Kataoka et al. | |
| 6,708,496 B2* | 3/2004 | Gadde et al. ............. | 60/773 |
| 6,715,295 B2 | 4/2004 | Gadde et al. | |
| 2004/0255595 A1* | 12/2004 | Morgan et al. ........... | 60/773 |
| 2005/0114010 A1* | 5/2005 | Healy et al. ............. | 701/100 |

* cited by examiner

*Primary Examiner*—L. J. Casaregola

(57) ABSTRACT

A method of controlling a gas turbine system (10) may include controlling an inlet guide vane position (98) to maintain a turbine (24) exhaust temperature at a corrected value that is a function of a compressor (12) inlet temperature and a turbine (24) normalized load. The method may include selecting the minimum value (138) of a part load tunable value, a part load maximum value and a fixed maximum value of a turbine (24) exhaust temperature for the corrected value. A corrected value setpoint may be determined (94) for the gas turbine system (10) operating at a part load condition where at least one of a fuel flow rate and the inlet guide vane position is controlled (98) so the corrected value does not exceed the corrected value setpoint. The corrected value may prevent a turbine (24) engine from exceeding its firing temperature during operation and ensure the engine operates within combustor dynamics and emissions limits.

18 Claims, 6 Drawing Sheets

METHOD OF CONTROLLING A POWER GENERATION SYSTEM

FIELD OF THE INVENTION

This invention relates in general to control systems for power generation such as gas turbines and more particularly to a method of controlling a gas turbine engine system to a corrected exhaust temperature of the turbine based on a set of turbine operating parameters and/or performance requirements.

BACKGROUND OF THE INVENTION

Power generation systems such as gas turbine power plants may include sophisticated combustion components and processes for efficiently combusting fuel and overall turbine operations. Many other detailed processes are involved in plant operations including loading and unloading the engine. Failure to load and unload the engine efficiently may lead to financial losses to the operator of the plant or its customers. With certain power plants, proper engine loading and unloading may require that the turbine exhaust temperature be well tuned and controllers for the inlet guide vanes are functioning properly. Otherwise, delays may be experienced in achieving baseload operations causing unscheduled engine tuning operations and related maintenance procedures with a resulting loss of revenues to the plant operator.

Prior art systems such as one used by the assignee of the present invention are known to control turbine systems by independently controlling the fuel flow, the inlet guide vane angles and fuel fractions as a function of different sets of input or operating parameters. For example, a fuel controller may input fuel in response to an operator's input demand for an increase in megawatts or to maintain an exhaust temperature below a setpoint. In certain systems this setpoint must be a margin below a maximum exhaust temperature to account for variations in performance specifications such as inlet guide vane hysterisis. This leads to inefficient plant performance that may cause higher levels of emissions than desired. The fuel controller merely allows more fuel to flow until the increase in demand is met or decreases fuel flow to reduce temperature. Further, preset inlet guide vane angles are used based on normalized load, ambient temperatures and other site-specific operating parameters.

DETAILED DESCRIPTION OF THE INVENTION

Figure 1:
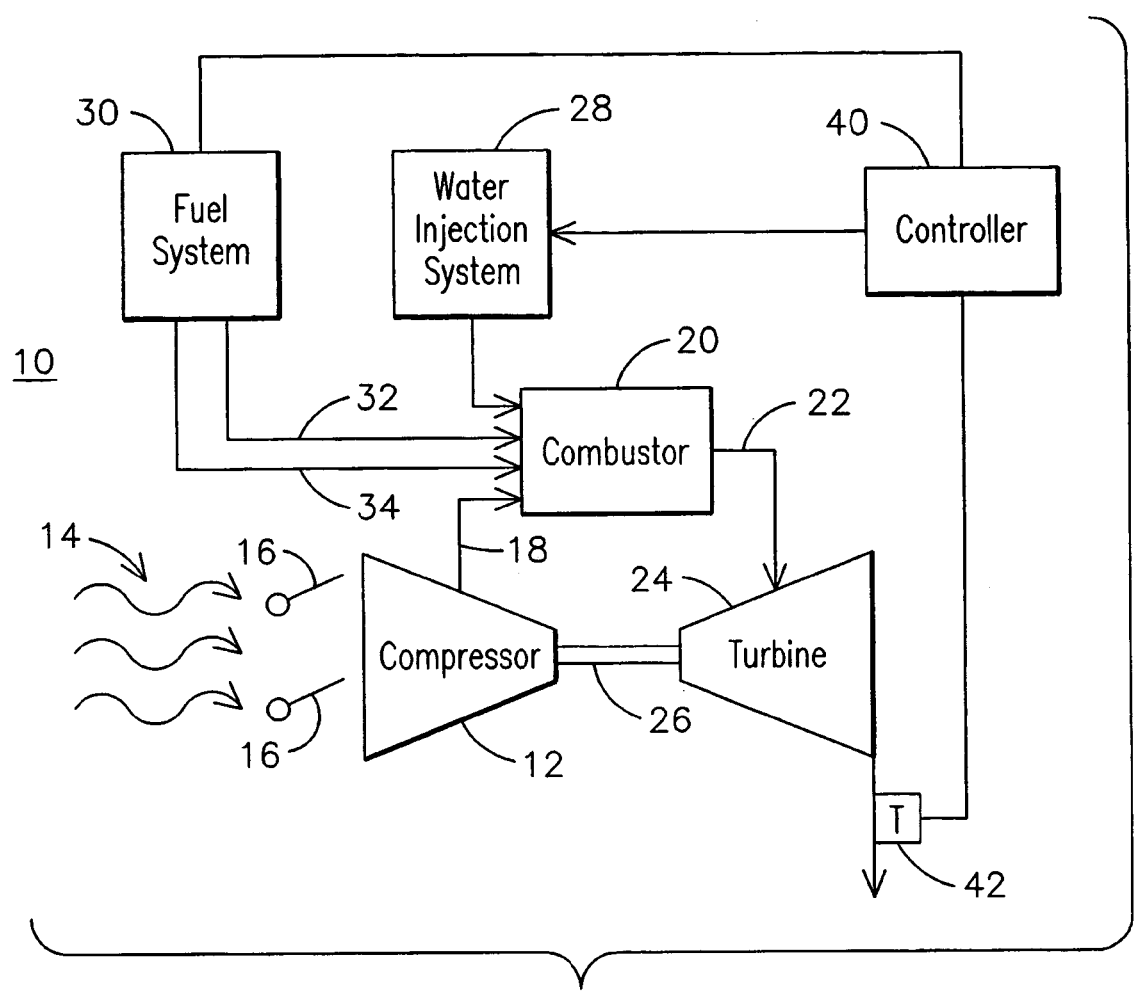
FIG. 1 is a schematic illustration of a gas turbine system incorporating aspects of the invention.

FIG. 1 illustrates a schematic of an exemplary gas turbine system 10, certain components of which may be referred to herein as an engine, which may employ embodiments of the invention. It will be recognized that embodiments of the invention may be used with various gas turbine or other power generation systems. System 10 may include a compressor 12 for inletting ambient air flow 14, which may be regulated by inlet guide vanes (IGV) 16 to control air flow to combustor 20. Compressed air 18 may be provided to a combustor 20, which may include an intermediate stage shell portion, and combustion gas 22 may be provided to a turbine 24 where energy is extracted to turn shaft 26. Shaft 26 may power the compressor 12 and auxiliary equipment such as an electrical generator (not shown).

System 10 may include a water injection system 28 and an exemplary fuel system 30. Fuel system 30 may provide two separately controllable flows of combustible fuel to combustor 20. A main fuel flow 32 may be supplied to a pre-mixed combustion zone of combustor 20 and a pilot fuel flow 34 may be supplied to a pilot diffusion combustion zone of combustor 20. Another exemplary combustor 20 may include multiple internal fuel stages that are fueled at different locations by fuel system 30 to improve fuel-air mixing. For example, combustor 20 may include a pilot stage and A, B and C stages. The total fuel flowing into the combustor may be expressed as respective fuel fractions of these stages. These fuel fractions may be adjusted or tuned to improve combustor dynamics and emissions at a given load, ambient temperature and specific humidity.

A controller 40 may be provided in the form of a processor or computer with executable instructions, a digital or analog control system, or other device for receiving input signals or data packets, processing data, executing instructions, producing appropriate output signals and transmitting data packets. Controller 40 may be configured with appropriate control modules and databases to execute various aspects of the invention. A temperature sensor 42 may be configured to measure a temperature responsive to combustion conditions within the combustor 20 such as the exhaust temperature of turbine 24 and/or the blade path temperatures of respective turbine blades (not shown) within the turbine 24. Other sensors or thermocouples (not shown) may be configured to measure the shell pressure of combustor 20, ambient temperature and the compressor 12 inlet temperature. In an embodiment of the invention four thermocouples may be located inside an inlet manifold of compressor 12. Signals indicative of these parameters may be transmitted to controller 40 and used in accordance with aspects of the invention.

Exemplary turbine system 10 may be one sold by the assignee of the present invention known in the industry as one from the W501F Series. System 10 may be considered operating at its baseload (100% load) when the engine has attained desired operating characteristics in association with a baseload firing curve. A baseload firing curve is an exhaust temperature curve that is thermodynamically calculated to provide a baseload design firing temperature of approximately 2584° F. for certain turbine systems 10, such as the W501F Series, with the associated inlet guide vanes 16 in a fully open position. If the IGVs 16 are not properly tuned then the exhaust temperature of turbine 24 may reach the baseload design firing temperature at a part load. This may occur when the IGVs 16 are too far closed relative to what their normal operation would predict. In accordance with known operating procedures, this deviation may result from an operator controlled IGV 16 angle that is not repeatable during increasing/decreasing load or on a long engine run due to IGV 16 actuator hysterisis. The controller 40 may be programmed to flag the operator that the engine or system 10 has reached the baseload design temperature during part load operation. When this occurs no additional megawatts (MW) can be produced and the situation may only be corrected by adjusting or retuning the IGVs 16. This results in system 10 downtime and financial loss.

The airflow through compressor 12, combustor 20 and turbine 24 varies with ambient temperature and pressure at a particular load consequently varying the flame temperature of combustor 20. This variation in flame temperature may cause drift in NOx and CO emissions with the varying ambient temperature and pressure. In certain turbine systems, the NOx emissions may drift more than 3 ppm and CO emissions may drift more than 50 ppm with ambient variations. The presence of a hysterisis problem with the IGVs 16 of certain turbine systems may make the drift even worse. If the NOx and CO emissions are tuned to the limits with no margin, it is possible that the flame temperature variation could cause the emissions to run out of regulatory or operational compliance.

Another aspect of the invention allows for enhanced engine loading control by permitting parallel control with respect to several critical turbine operating parameters. Four independent engine controllers may be used with respect to exhaust temperature, blade path temperature, engine load and IGV position. The controllers regulate fuel and air flow and may work in parallel in response to operator demands and to the pre-determined operating setpoints to maintain a desired exhaust temperature during engine operation. The desired exhaust temperature may be set based on various parameters such as hot parts life, emissions and part load efficiency and contractual obligations to customers.

One aspect of the invention provides a closed loop IGV control. The closed loop IGV control allows for modulating the IGVs iteratively from a selected starting point to obtain a desired setpoint at a given engine load condition based on a corrected exhaust or outlet temperature of turbine 24. This eliminates the biases associated with a predetermined IGV schedule based on a normalized load and ambient conditions such as temperature and specific humidity. The closed loop IGV control decreases the complexity in the control system and simplifies system commissioning and tuning. This is because the relatively complicated process of setting up the ambient temperature biasing and load biasing that would otherwise be used to improve the engine stability at different engine operating conditions is no longer required. Normalized load may be defined as the percentage load normalized to the maximum power of a turbine 24 at a particular ambient temperature. For example, turbine 24 may generate maximum power or baseload (100% load) of 215MW on a 0° F. ambient temperature day and of 150MW on a 110° F. ambient temperature day. A 60% normalized load for these temperatures would be 129MW (215×0.6) and 90MW (150× 0.6), respectively.

Aspects of the invention allow the engine controllers to control the exhaust temperature based on a closed loop or computer controlled IGV schedule rather than a predetermined IGV schedule. The closed loop IGV schedule is determined in response to operating conditions of a turbine and/or based on such conditions. This increases the versatility of the overall engine control process by reducing the variation in firing temperature that may result from changes in ambient temperature. This minimizes the drift in NOx/CO emissions and combustor dynamics. Enabling a closed loop control on the IGVs based at least in part on engine exhaust temperature allows the IGVs to assume operating positions that are not preset positions. This eliminates any hysterisis issues caused by the mechanical linkage in an IGV actuator where engine opertion is dependent on accurate preset angles for the IGVs.

In one aspect the IGVs may automatically modulate to attain or maintain a corrected exhaust temperature. The engine exhaust temperature has a more direct correlation to the combustion flame or firing temperature compared to that of the IGV angle. The NOx and CO emissions may be controlled by modulating the flame temperature directly through controlling the exhaust temperature rather than indirectly by changing the postion of the IGVs. This is because changing IGV position will increase/decrease flame temperature with changes in ambient temperature at a constant load. This is due to variations in engine air mass flow rates caused by changes in ambient temperature. Aspects of the invention provide the capability to maintain either a constant actual flame temperature or constant actual exhaust temperature above approximately a 50% normalized load to 100% or baseload operation. This control on flame temperature reduces or eliminates the risk of over firing the engine and consequently improves hot parts life, prevents part load engine stalling and reduces the NOx/CO emissions drift.

Figure 2:
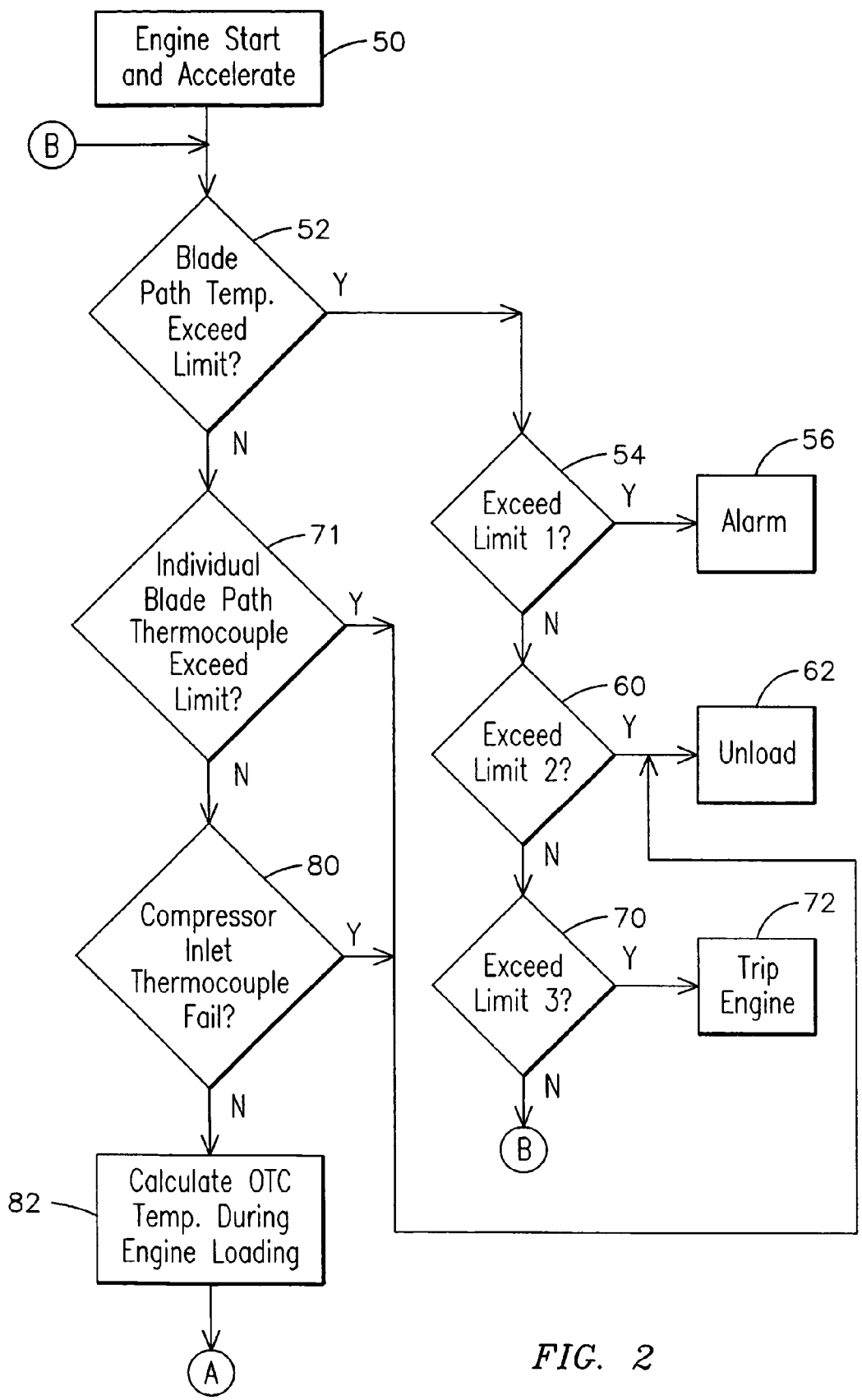
FIG. 2 is a partial flow diagram of a method of controlling the system of FIG. 1.

In one aspect step 50 of FIG. 2 allows for engine start and acceleration such as when bringing system 10 up to power generation levels. During acceleration, sensor or thermocouple 42 may sense and transmit data to controller 40 indicating the blade path temperature of turbine blades within turbine 24. If the average blade path temperature exceeds a limit in step 52 then certain actions may be taken. In an embodiment there may be sixteen thermocouples 42 located downstream of respective row four turbine blades.

For example, Table 1 illustrates several blade path temperature limits based on the shell pressure of combustor 20. The blade path temperatures should be maintained below the limits in Table 1 during operation of turbine 24. If, in step 54, the average blade path temperature calculated from a plurality of sensor readings exceeds one of the BP Temperature Limits in Table 1 by approximately 30° F. then an alarm may be activated in step 56. If, in step 60, such BP Temperature Limit is exceeded by approximately 60° F. then the system 10 may automatically reduce the engine load to a safe operating load condition in step 62. If, in step 70, such BP Temperature Limit is exceed by approximately 80° F. then the engine may shut down completely in step 72 so an operator may diagnose the problem and troubleshoot before restarting the engine. If an individual blade path thermocouple temperature exceeds a predetermined limit in step 71, such as approximately 1300° F. within an ignition period and during acceleration then the engine may be tripped in step 72.

TABLE 1

| Linearly interpolate between the points. | |
|---|---|
| Combustor Shell Pressure | BP Temperature Limit |
| 0 kPa-g (0 psig) | 593° C. (1100° F.) |
| 103 kPa-g (15 psig) | 593° C. (1100° F.) |
| 900 kPa-g (130 psig) | 399° C. (750° F.) |

Step 80 allows for determining whether one or more thermocouples used for measuring the inlet temperature of compressor 12 has failed at anytime during operation of system 10. The thermocouples may be located inside an inlet manifold of compressor 12. If one or more has failed then an alarm may be activated and the reading from a failed thermocouple may be removed from the average compressor inlet temperature. If all thermocouples fail then the engine may unload to approximately 20% load in step 62.

The power generation control process of the invention may be based in part on an exhaust or outlet temperature corrected (OTC) value is provided for use with a gas turbine system such as exemplary system 10 illustrated in FIG. 1. This control methodology may include an OTC value that is a function of the inlet temperature of compressor 12, and the average exhaust temperature and speed of turbine 24. This functional relationship may be formulated to control the combustion turbine 24 to a corrected exhaust temperature based on variations in ambient temperature and turbine 24 speed. Equation 1 below may be used in step 82 to calculate the corrected exhaust temperature values such those used during the loading of system 10. The engine exhaust temperature may be corrected based on Equation 1, which allows for controlling the engine to the corrected exhaust temperature based on variations in ambient temperature and engine speed. In this respect, the exhaust temperature may be corrected to a standard condition of 0° F. ambient condition so that comparisons of engine emissions and performance can be made more easily at various ambient conditions.

Equation 1:

$$OCT = T2T - [K1*CIT^3] - [K2*CIT^2] - [K3*CIT] - \left[K4*\left(1 - \frac{RPM}{3600}\right)\right]$$

Figure 4:
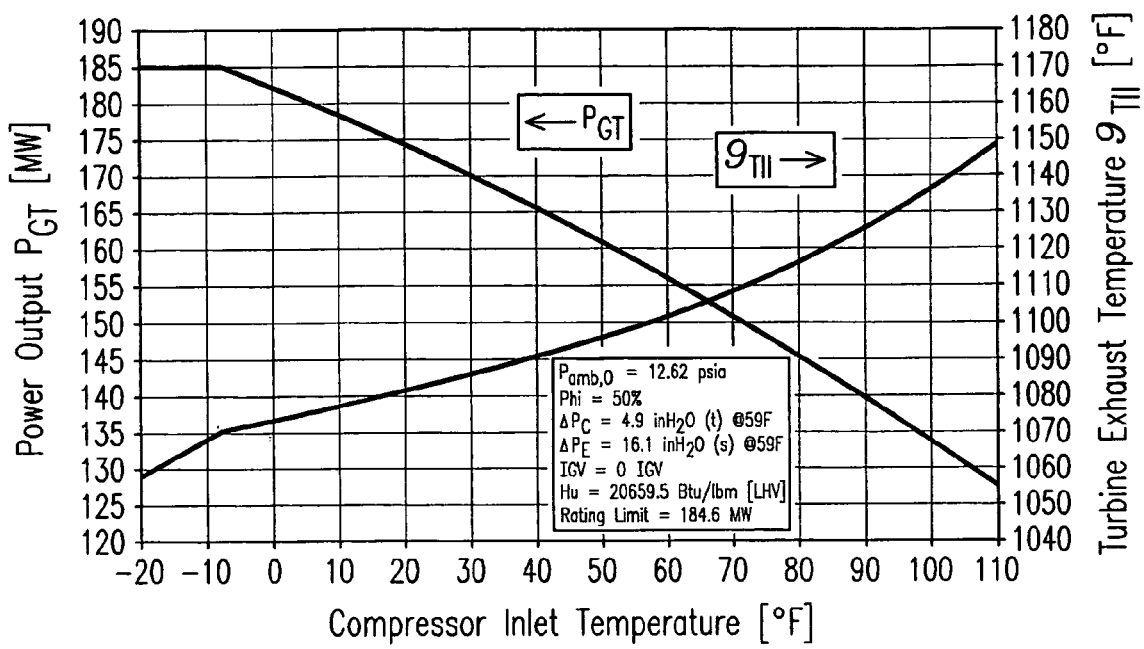
FIG. 4 is a graph of a normalized load curve for an exemplary turbine system.

Where,
- T2T = exhaust temperature average (° F.);
- CIT = compressor inlet temperature average (° F.);
- RPM = turbine speed (RPM); and
- K1, K2, K3 and K4 are constants used to determine the exemplary normalized load curve shown in FIG. 4 and in an embodiment may have the values K1=0.000022, K2=0.00055, K3=0.36 and K4=332.2. These constants may be determined based on site specific engine conditions or operating parameters such as geographic elevation, operating ambient conditions, combustion turbine inlet/exhaust pressure losses, operating gas compositions, operating fuel gas temperature, compressor/turbine clearances, rotor air cooling temperature, baseload firing temperature and IGV position, for example. These exemplary constants ensure the corrected exhaust temperature, which is used for engine control is in a proper relationship with the measured exhaust temperature and help to ensure the engine does not over-fire above the designed temperature level at full load condition.

Figure 3:
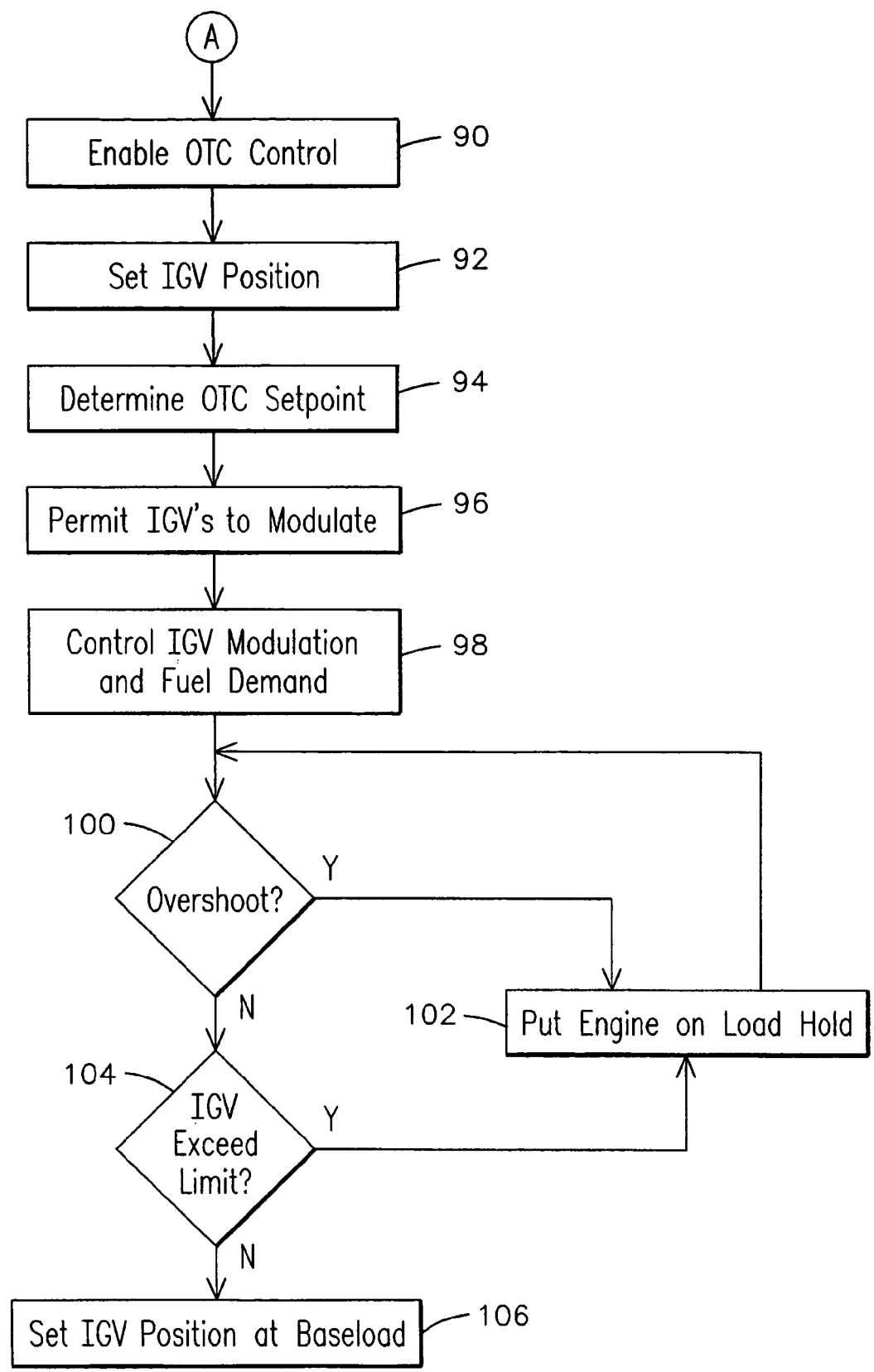
FIG. 3 is a continuation of the flow diagram of FIG. 2.

FIG. 3 shows that aspects of the control process may be automatically enabled in step 90 once the engine is synchronized with a power grid such as a grid for distributing electricity, for example. Once synchronized, step 92 allows for setting the IGVs 16 at a predetermined initial angle; for example, at approximately 45° for a simple cycle operation and at approximately 30° for a combined cycle operation. A combined cycle refers to a power plant where the total power output is a combination of combustion and steam cycles. The excess exhaust energy from a combustion turbine may be used to generate high-pressure steam that is sufficient for driving a steam turbine, which increases the efficiency of the plant. Aspects of the invention contribute to improved efficiency and heat rate at combined cycle plants by maintaining higher exhaust temperature at part load during cold ambient temperatures. This allows for a plant to generate more steam that could be used at multiple applications at the plant leading to a higher overall plant efficiency.

Step 94 allows for determining an OTC setpoint based on engine operating characteristics, which in an embodiment may be selected from the following three conditions:
 a) maximum exhaust temperature (1160° F., for example)
 b) part load tunable OTC setpoint
 c) part load maximum OTC setpoint (Equation 2 below)

The control logic for IGV modulation and a fuel flow demand may be configured to select the lowest temperature of these three conditions as the OTC setpoint. Selecting the lowest temperature protects against over-firing the engine, which may cause severe engine damage. This also protects against manual errors such as entering a temperature value above engine limits that could cause the engine to trip. Equation 2 below allows for calculating a part load maximum OTC setpoint value, which may be based on compressor 12 inlet temperature, normalized load and engine speed. In an embodiment, the relationship may be developed to prevent the firing temperature from exceeding a maximum baseload turbine 24 inlet temperature of approximately 2584° F. such as for use with a W501F turbine system sold by the assignee of the present invention.

Equation 2:

$$OCT_P = C0 + [C1*(CIT)] + [C2*(\%Load)] + [C3*(\%Load)^2] + [C4*(CIT)*(\%Load)] + \left[C5*\left(1 - \frac{RPM}{3600}\right)\right]$$

Where,
- % Load = Normalized Load;
- CIT = Compressor Inlet Temperature (° F.);
- RPM = turbine speed (RPM); and
- C0, C1, C2, C3, C4 and C5 are constants with respect to the control curve of FIG. 3 having the values C0=1475.4, C1=0.74, C2=−690.8, C3=288.8, C4=−0.75 and C5=−332.2. These constants may be determined based on baseload flame temperature taking into account other site specific factors such as geographic elevation, operating ambient conditions, combustion turbine inlet/exhaust pressure losses, operating gas compositions, operating fuel gas temperature, compressor/turbine clearances, and rotor air cooling temperature, for example.

Figure 5:
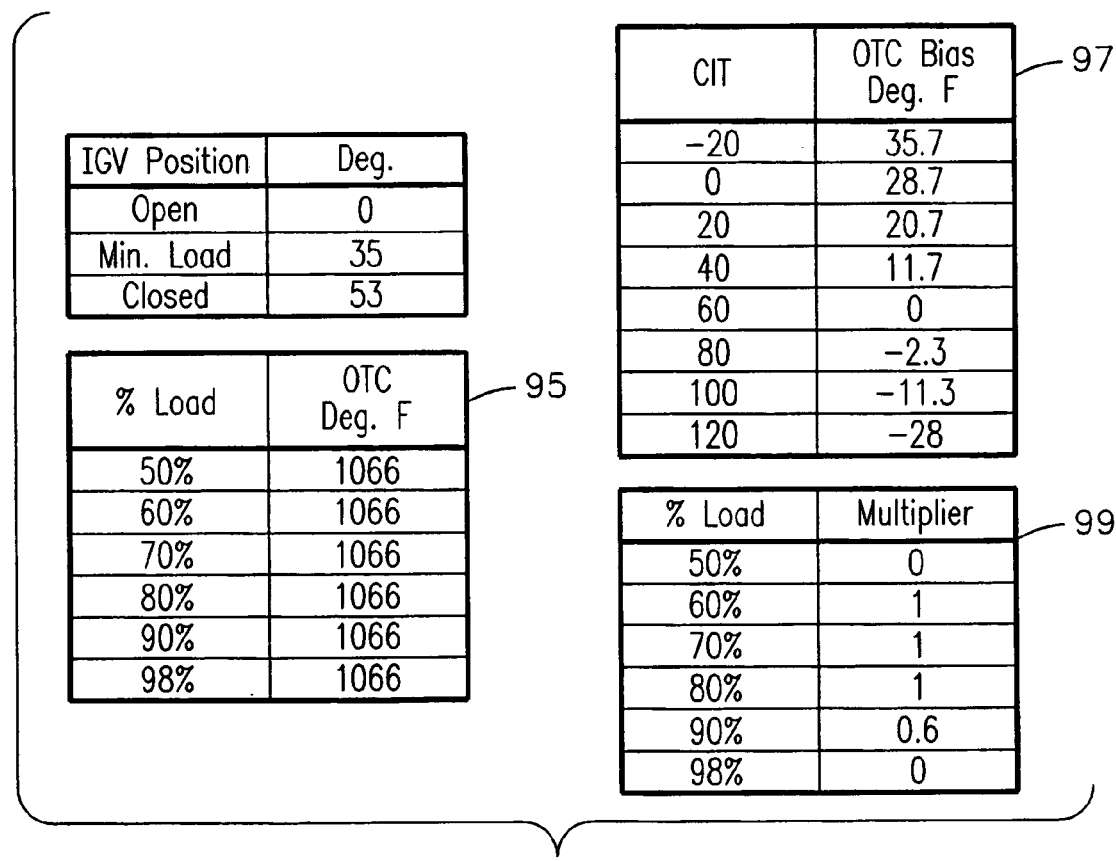
FIG. 5 is a set of tables containing data with respect to an exemplary turbine system.

The average engine exhaust temperature should not exceed 1160° F. during engine loading with the maximum allowable overshoot of average exhaust temperature being about 10° F. A combustion engineer based on emissions, combustor dynamic limits and/or other operating parameters at a specific site, may define the part load tunable OTC setpoint. FIG. 5 illustrates a set of tables containing exemplary data derived for use at a specific site in accordance with aspects of the invention. The data in OTC column 95 may be calculated using Equation 1 and combustion tuning parameters such as those used for predicting NOx emission levels and combustor dynamics, for example, for a specific site with system 10 operating at baseload. Exemplary data in the OTC Bias column 97 and the Multiplier column 99 may be used to adjust the data in OTC column 95 at a given load and combustor inlet temperature.

The respective data in the OTC Bias and Multiplier columns 97, 99 may be derived based on site specific operating or performance parameters. For example, this data may be derived when performing engine tuning so that the adjusted or tuned OTC value is suitable to maintain emissions under certain levels and combustor dynamics and other engine protection factors under operating guidelines for that site. In an embodiment, the adjusted OTC value for use at the site may equal the OTC value from column 95+(the OTC Bias at a given CIT from column 97 * the Multiplier at a given load from column 99) and may be used from about 60% load to about 95% load. Thus, at an 80% load and 0° F. CIT the adjusted OTC value would equal 1066+(28.7*1) =1094.7° F. The IGVs and fuel flow may be controlled in parallel to produce an exhaust temperature that would result in an OTC value of 1094.7° F. using Equation 1. In this respect, as fuel flow increases to meet a MW demand the actual exhaust temperature will increase and the IGVs may adjust or modulate automatically in response to the temperature increase.

An empirically developed generic IGV schedule based on normalized load may be used as a starting point for the closed loop iteration to obtain the desired part load tunable OTC setpoint. This OTC setpoint may be developed based on engine tuning, i.e., maintaining emissions under certain levels and combustor dynamics and other engine protection factors under operating guidelines. Step 96 allows for the IGVs to commence modulation, which may be at above approximately 50% load conditions or when the corrected exhaust temperature determined in step 82 reaches the desired OTC setpoint determined in step 94. In an embodiment, the maximum allowable difference or undershoot between the measured OTC value and the OTC setpoint should not exceed 30° F. and the engine normalized load should not be increased above 55% in the event the measured OTC value exceeds the undershoot. If the OTC value undershoots the OTC setpoint then the engine may be put on load hold at 55% load until the measured OTC reaches the OTC setpoint.

The IGV starting position schedules may vary for combined (Table 2) and simple cycle operations (Table 3). The IGV position may be controlled in step 98 so that they do not modulate more than five-degrees on either side of their schedule value at a respective normalized load condition. If the IGV position exceeds the five-degree limit on either side of the associated setpoint in step 104, an alarm may be indicated by the control system and the engine may be put on load hold in step 102.

TABLE 2

| % Load | IGV Angle Degrees |
|---|---|
| 0% | 35 |
| 30% | 35 |
| 40% | 35 |
| 50% | 35 |
| 60% | 32 |
| 70% | 26 |
| 80% | 17 |
| 90% | 9 |
| 95% | 0 |
| 100% | 0 |

TABLE 3

| % Load | IGV Angle Degrees |
|---|---|
| 0% | 45 |
| 30% | 45 |
| 40% | 40 |
| 50% | 35 |
| 60% | 32 |
| 70% | 26 |
| 80% | 17 |
| 90% | 9 |
| 95% | 0 |
| 100% | 0 |

The IGV closed loop control should remain active until the IGV position reaches the fully open position or 0° and the engine reaches baseload conditions. At baseload, in step 106, the IGV position may be set based on site-specific performance requirements such as the turbine design firing temperature at baseload and respective IGV angles.

The control logic programmed into controller 40 may be configured for executing various control actions in response to certain operating conditions. For example, the overshoot of a corrected average exhaust temperature at baseload condition during steady state may be limited to approximately 3° F. and during transient conditions to approximately 10° F. The IGV position oscillation may be minimized to less than one degree. These control aspects ensure the emissions and combustor dynamic levels to which the engine was tuned do not exceed allowable levels. If the demand IGV angle deviates by more than three degrees from the indicated angle for more than five seconds then an alarm may alert an operator to inspect the IGVs. If the demand IGV angle deviates by more than five degrees from the indicated angle for more than seven seconds then the engine may be tripped to protect system 10 components such as combustor 20.

In another aspect the fuel fluctuation may be minimized to less than 1% of the total flow by controlling fuel throttle valves to minimize fluctuations in engine load. If an individual fuel stage throttle valve deviates from the demand requested by controller 40 by more than +/−5% for more than three seconds then the engine may be tripped. If an individual fuel stage throttle valve reaches the maximum open position setpoint the engine may be unloaded until the valve reaches a controllable position. These control aspects prevent over fueling or under fueling to ensure the engine does not over-fire and prevent undesirable combustor dynamics. With respect to step 100, the actions in Table 4 may be taken in step 102 instead of putting the engine on load hold if the OTC value during operation overshoots the OTC setpoint calculated in step 94 by the specified duration.

TABLE 4

| OTC Deviation from Setpoint | Duration | Action |
|---|---|---|
| 10° F. | 5 sec | Alarm |
| 20° F. | 5 sec | Unload Engine to 90% |
| 30° F. | 5 sec | Unload Engine to 50% |
| 40° F. | 5 sec | Trip Breaker |
| 50° F. | 1 sec | Engine Trip |

The blade path temperature sensing and actions in response to temperature limits being exceeded may remain active during the entire operation of the engine. A blade path temperature used for initiating the primary action on controlling the IGV may be measured downstream of the row 4 turbine blades. The blade path temperature provides an initial indication of possible over-firing of the engine when their temperature limits are approached. If the average blade path temperature exceeds 1185° F. during engine operation, then the control module may limit the fuel flow instantaneously at a rate until the desired OTC setpoint value from step 94 is met. Exhaust gas temperature control may remain active during entire operation. If the average exhaust gas temperature exceeds 1160° F. during engine operation, the control module may limit the fuel flow instantaneously and the engine may be put on load hold. In one aspect, the IGVs may start opening when the average exhaust temperature exceeds 1150° F. to prevent this condition.

The actions in Table 5 below may be taken if the compressor inlet temperature (CIT) thermocouples (T/C) fail during engine operation.

| Failure Mode | Timer | CIT Avg. Status | Action |
| --- | --- | --- | --- |
| One T/C Fails | 0 sec | Remove T/C reading from Average | Alarm |
| Two T/Cs Fail | 0 sec | Remove T/C reading from Average | Alarm |
| Three T/Cs Fail | 0 sec | Remove T/C reading from Average | Alarm |
| All T/Cs Fail | 2 sec | Latch the T/C reading to 59° F. | Unload to 20% Load |

Figure 6:
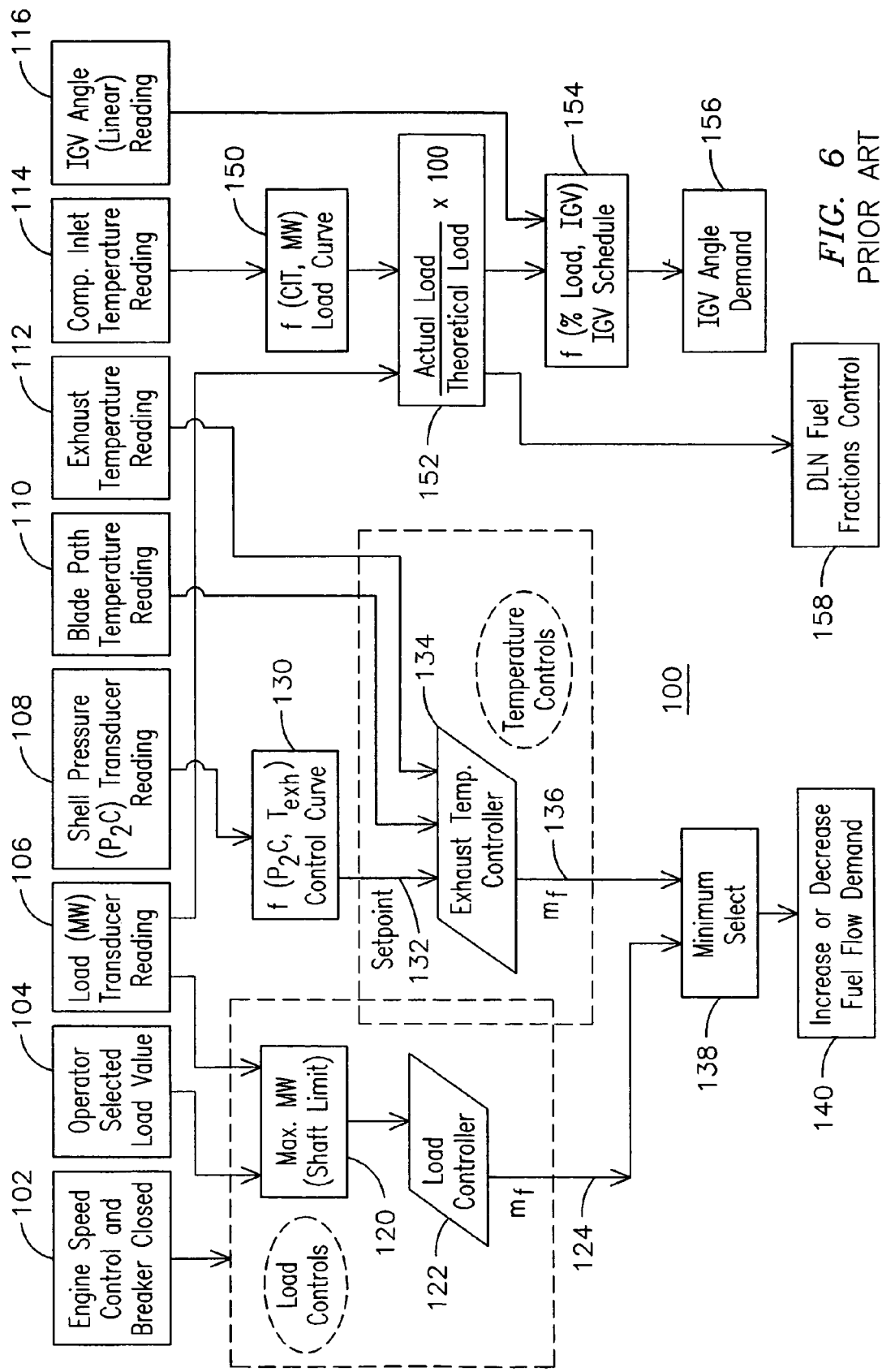
FIG. 6 is a schematic of a prior art engine control process map.

FIG. 6 is a schematic of a prior art engine control process map 100 that includes a set of data inputs or operational parameters 102, 104, 106, 108, 110, 112, 114 and 116 that may be input into a control module for controlling aspects of a turbine system. The system's engine ignition and acceleration may be controlled up to a rated speed such as 3600 RPM based on the combustor shell pressure 108 and average blade path temperature 110. An operator selected load value (MW) 104 and an actual load (MW) transducer reading 106 are input through a maximum MW shaft limit regulator 120 into a load controller 122. Load controller 122 determines the difference between the operator-selected load value and the actual load value and outputs a first mass fuel flow signal 124 required to achieve the operator-selected load value. Load controller 122 may remain active below 100% load and inactive at baseload, at which time a temperature controller 134 may become active.

An exhaust temperature control curve 130 may be established and programmed into the control module for controlling aspects of the turbine system. The control curve 130 is a function of combustor shell pressure 108 and turbine exhaust temperature and is established to meet certain operating requirements of the turbine system such as achieving a firing or flame temperature of 2584 F°. During turbine operation, the shell pressure reading 108 is used to determine a corresponding exhaust temperature setpoint 132, which is input into an exhaust temperature controller 134. An actual exhaust temperature reading 112 is input into exhaust temperature controller 134, which determines the difference between the actual reading and the setpoint and outputs a second mass fuel flow signal 136 required to achieve the exhaust temperature setpoint. A blade path temperature reading 108 is input into the exhaust temperature controller 134, which trips the engine if reading 108 exceeds an upper limit. The minimum fuel flow value of the first and second fuel flow signals 124, 136 is selected 138 and a respective increase or decrease in a fuel flow demand signal 140 is generated.

In another aspect of the prior art process map 100 of FIG. 6 for controlling a turbine system, a load control curve may be established 150 that is a function of a compressor inlet temperature and MW. The control curve 150 may be established to meet certain operating requirements of a turbine system and may be programmed into the control module for controlling aspects of that system. During turbine operation, a compressor inlet temperature reading 114 and an actual load (MW) transducer reading 106 are used to determine a normalized load percentage 152. An IGV linear angle reading 116 is used with the normalized load percentage and a predetermined IGV angle schedule to determine an IGV angle 154 at that load. A respective IGV angle demand signal 156 is then generated, which causes the IGVs to be repositioned to the demanded angle. The normalized load percentage 152 is used to control fuel fractions 158 such as "Dry Low NOx" ("DLN") fuel fractions that may used in certain combustion turbines. Once set to meet emissions or other system performance requirements, the predetermined IGV angle and DNL fuel fraction schedules may not change during turbine operation. This does not allow for adjustments to be made in response to unexpected variations in turbine performance such as IGV hysterisis, for example. Engine process map 100 controls the predetermined IGV and DLN fuel fraction schedules independent of the temperature and load controls. This may result in premature exhaust temperature control at part load that prevents further loading of the engine and NOx and CO emissions drift.

Figure 7:
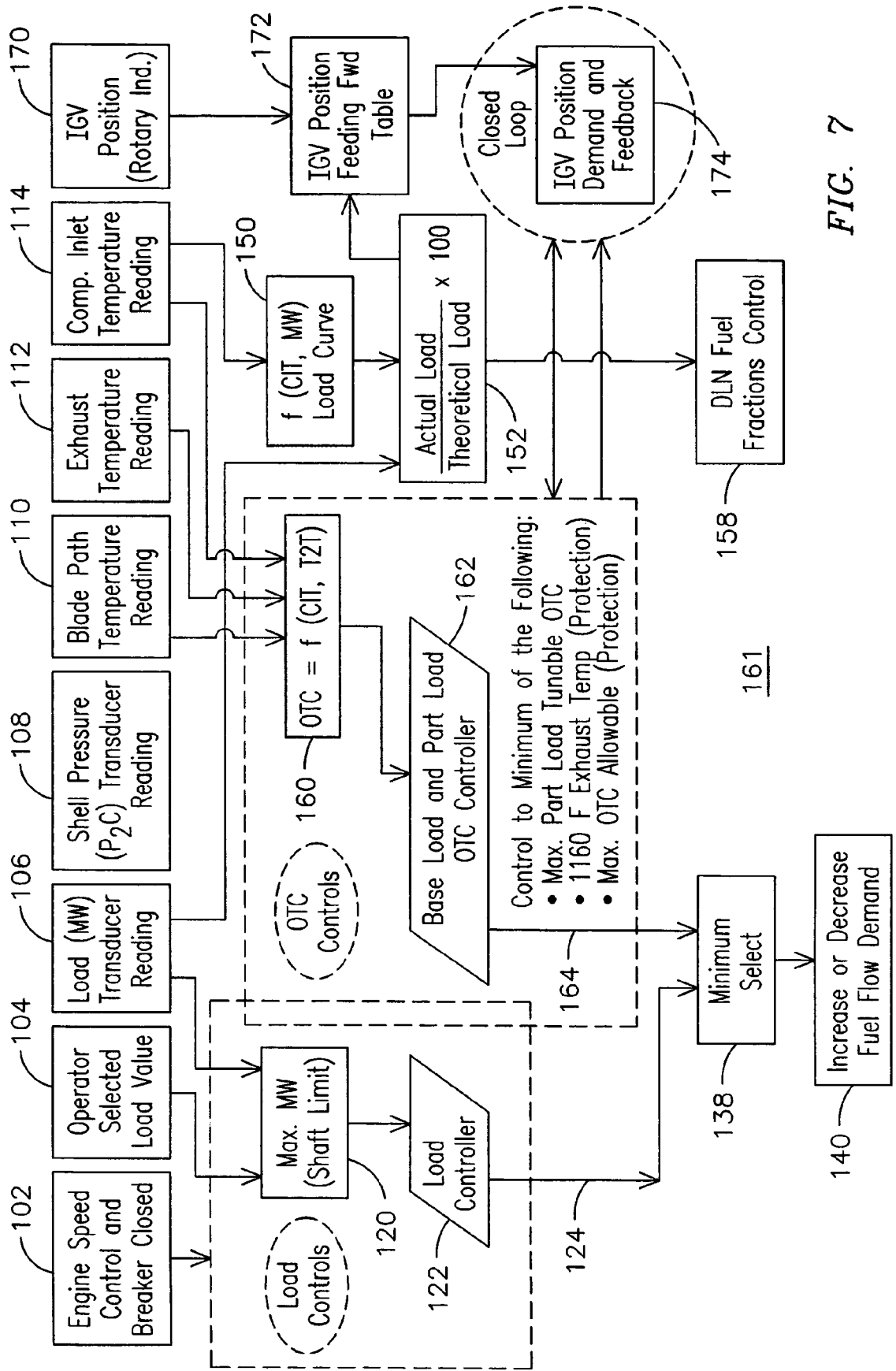
FIG. 7 is a schematic of an exemplary engine control process map in accordance with the invention.

FIG. 7 is a schematic of an exemplary engine control process map 160 for controlling aspects of a turbine system, such as system 10, in accordance with the invention. The engine control process map 160 may include a set of data inputs or operational parameters 102, 104, 106, 108, 110, 112, 114 and 170 that may be input into a control module, such as controller 40, configured for controlling aspects of system 10. The system's 10 engine ignition and acceleration may be controlled in step 50 up to a rated speed such as 3600 RPM based on the combustor shell pressure 108 and average blade path temperature 110. An operator selected load value (MW) 104 and an actual load (MW) transducer reading 106 may be input through a maximum MW shaft limit regulator 120 into a load controller 122. Load controller 122 determines the difference between the operator-selected load value and the actual load value and outputs a first mass fuel flow signal 124 required to achieve the operator-selected load value. Load controller 122 may remain active below 100% load and may be inactive at baseload.

Another aspect of the invention allows for a control module of controller 40 to be configured to control IGVs 16 and fuel flow, which may be active below 100% load. An outlet temperature corrected (OTC) value of Equation 1 is expressed in 160 as a function of compressor inlet temperature (CIT) and turbine exhaust temperature (T2T). A range of OTC values may be established and programmed into controller 40 for controlling aspects of system 10. The OTC values may be calculated or determined based on Equation 1 and tuned with respect to a specific site based on that site's set of operating or performance parameters. An exemplary set of tuned values are shown in FIG. 5. During turbine operation, the compressor 12 inlet temperature reading 114 may be used by controller 40 to determine a corresponding OTC value based on the relationship expressed in Equation 1 and which may be further tuned with respect to a site. A baseload and part load controller 162 may output a second fuel flow signal 164 based on a minimum valued selected from the group consisting of a) the maximum part load tunable OTC value, b) 1160° F. exhaust temperature protection value and c) the maximum part load OTC allowable protection value such as described for step 94. The minimum fuel flow value of the first and second fuel flow signals 124, 164 is selected 138 and a respective increase or decrease in a fuel flow demand signal 140 is generated.

In another aspect of the exemplary process map 160 of FIG. 7 for controlling a turbine system, a load control curve may be established 150 that is a function of a compressor inlet temperature and MW. The control curve 150 may be established to meet certain operating requirements of turbine system 10 and may be programmed into the control module of controller 40. During turbine operation, a compressor inlet temperature reading 114 and an actual load (MW) transducer reading 106 are used to determine a normalized load percentage 152. The normalized load percentage 152 may be used to control DLN fuel fractions 158. An IGV angle or rotary position indicator reading 170 may be used with the normalized load percentage and an IGV position feeding forward table 172 to allow for the fuel flow and IGVs to be controlled dependently. The IGV position table may be empirically developed based on normalized load as described above. A respective IGV position demand signal may then be generated and compared to input from the baseload and part load controller 162. Controller 162 and the IGV position demand and feedback 174 allows for the fuel flow increase or decrease demand and the IGV position to be controlled simultaneously or as a function of each other.

In an exemplary embodiment the IGV may be controlled as an initial step in controlling system 10 to the OTC setpoint with the fuel flow demand being controlled as a trimming step to more precisely control system 10 to that setpoint. For example, if the IGV control allows the actual OTC value to exceed the OTC setpoint then the fuel flow may be controlled to reduce the fuel. This control scheme provides significant improvements to the efficiency of system 10 such as avoiding part load temperature control and reducing emissions drift.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A method of controlling a gas turbine system, the method comprising:
controlling compressor inlet guide vane position to maintain a turbine exhaust temperature at a corrected value that is a function of a compressor inlet temperature and a turbine normalized load.

2. The method of claim 1 further comprising:
selecting the corrected value to be a minimum value from the group consisting of a part load tunable corrected value, a part load ruaxinaum corrected value and a fixed maximum value of a turbine exhaust temperature.

3. The method of claim 1 further comprising:
controlling the turbine exhaust temperature at a baseload by controlling the fuel flow only with the compressor inlet guide vane in a fully open position.

4. The method of claim 1 further comprising:
calculating the corrected value so that a turbine firing temperature is not exceeded when the turbine is operating.

5. The method of claim 1, the step of controlling further comprising:
determining a corrected value setpoint for the gas turbine system operating at a part load condition; and
controlling at least one of a fuel flow rate and the compressor inlet guide vane position so the corrected value does not exceed the corrected value setpoint.

6. A method of controlling a gas turbine system comprising a compressor receiving air through inlet guide vanes, a combustor receiving compressed air from the compressor and fuel from a fuel system to produce hot combustion gas, and a turbine for expanding the hot combustion gas to extract work, the method comprising:
determining a corrected turbine exhaust temperature setpoint based on engine operating characteristics;
calculating a corrected turbine exhaust temperature; and
controlling at least one of an inlet guide vane position and a fuel flow rate to maintain the corrected turbine exhaust temperature within a limit of the corrected turbine exhaust temperature setpoint.

7. The method of claim 6 wherein the corrected turbine exhaust temperature is calculated as a function of a turbine exhaust temperature, a compressor inlet temperature and a turbine speed.

8. The method of claim 6 further comprising:
determining a turbine blade path temperature average;
activating an alarm if the turbine blade path temperature average exceeds a first limit;
unloading the turbine if the turbine blade path temperature average exceeds a second limit; and
tripping the turbine if the turbine blade path temperature average exceeds a third limit.

9. The method of claim 8 further comprising:
activating the alarm if the turbine blade path temperature average exceeds the first limit at a first combustor shell pressure;
unloading the turbine if the turbine blade path temperature average exceeds the second limit at a second combustor shell pressure; and
tripping the turbine if the turbine blade path temperature average exceeds the third limit at a third combustor shell pressure.

10. The method of claim 6 wherein the corrected turbine exhaust temperature is calculated as a function of a turbine exhaust temperature, a compressor inlet temperature and a turbine speed to prevent the turbine system from exceeding emission and combustor dynamic limits during operation.

11. The method of claim 6, further comprising:
calculating a maximum value for the corrected turbine exhaust temperature setpoint.

12. The method of claim 11 wherein the maximum value is calculated as a function of a turbine normalized load, a compressor inlet temperature and a turbine speed.

13. The method of claim 6 wherein the corrected turbine exhaust temperature setpoint is selected from the group consisting of a maximum turbine exhaust temperature, a part load corrected turbine exhaust temperature setpoint and a maximum corrected turbine exhaust temperature setpoint.

14. A method of controlling a gas turbine engine, the method comprising:
calculating normalized power level as a function of a maximum power level achievable at a given ambient temperature;

controlling combustion in a combustor of the gas turbine engine to maintain an average blade path temperature below a predetermined maximum temperature;

controlling fuel delivery to the combustor in response to a power level demand; and controlling inlet guide vane position to regulate a temperature responsive to a flame temperature in the combustor to a set point temperature compensated for a temperature responsive to inlet air temperature and for normalized power level.

15. The method of claim 14 further comprising controlling fuel delivery among a plurality of stages in the combustor in response to normalized power level.

16. The method of claim 14 further comprising further controlling fuel delivery to the combustor in the event that the control of inlet guide vane position is inadequate to regulate the temperature responsive to a flame temperature in the combustor to the set point temperature.

17. The method of claim 14 further comprising controlling combustion in the combustor to maintain the blade path temperature below a predetermined maximum temperature that varies as a function of combustor shell pressure.

18. The method of claim 14 further comprising setting the inlet guide vane to a full open position and controlling temperature responsive to a flame temperature in the combustor by controlling only fuel delivery once the gas turbine engine has achieved a 100% normalized power level.

* * * * *